UNITED STATES PATENT OFFICE.

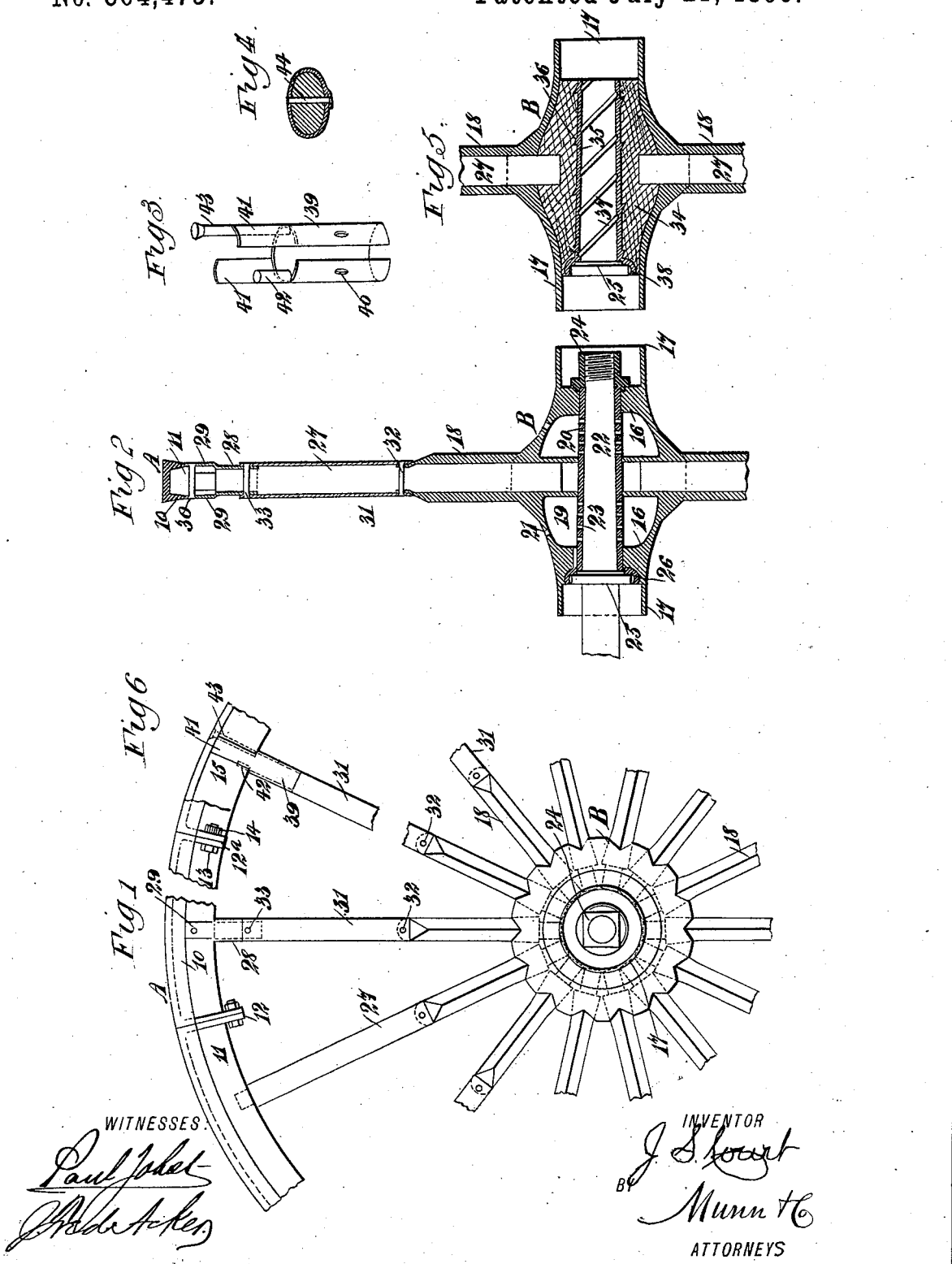

JOHN S. COURT, OF SPRINGDALE, TENNESSEE.

WHEEL.

SPECIFICATION forming part of Letters Patent No. 564,473, dated July 21, 1896.

Application filed December 10, 1895. Serial No. 571,683. (No model.)

*To all whom it may concern:*

Be it known that I, JOHN S. COURT, of Springdale, in the county of Shelby and State of Tennessee, have invented a new and useful Improvement in Wheels, of which the following is a full, clear, and exact description.

My invention relates to a wheel for vehicles; and the object of the invention is to improve upon the construction of the tire, hub, axle-box, and spokes in such manner that the tire may be tightened in the event the rim or felly should shrink, and the spoke be protected from injury by collisions, and the hub be rendered much more durable and stronger than ordinary, and likewise to provide a ready means of lubricating the axle-spindle.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a partial side elevation of the wheel having the improvement applied thereto. Fig. 2 is a vertical section through one of the spokes, the rim, tire, hub, and axle-box of the wheel. Fig. 3 is a perspective view of a modified form of the spoke-sleeve. Fig. 4 is a horizontal section through the spoke, illustrating the manner in which the modified form of sleeve is attached thereto. Fig. 5 is a vertical section through a hub provided with a wood center, illustratiing a modification in the form of the axle-box; and Fig. 6 is a partial side elevation of the rim and tire of a wheel, illustrating another way of attaching the ends of the tire on the rim or felly.

In carrying out the invention the tire A is provided with a flange 10, which extends downward from each side, and this flange is beveled both interiorly and exteriorly and is made to fit over a rim or felly 11, having an exterior bevel corresponding to the interior conformation of the said tire.

The felly or rim 11 may be of any suitable or approved construction, and preferably the ends of the tire are provided with inwardly-extending lugs 12, which project beyond the inner face of the rim or felly, and the said lugs are made to abut and are fastened together by suitable nuts and bolts, as shown in Fig. 1, in order that in the event the felly or rim should shrink the tire may be tightened, and whereby, furthermore, the tire cannot slip from off the felly or rim of the wheel and the wheel cannot dish or turn inside out.

As shown in Fig. 6, the lugs $12^a$, formed at the ends of the tire, are not carried beyond the inner face of the rim or felly, but are connected by bolts 13, provided, preferably, with ratchet-nuts 14, and in both forms of lugs 12 and $12^a$ they are preferably countersunk in the rim or felly of the wheel. The lugs 12 are employed on exceedingly heavy wheels and the lugs $12^a$ are used in connection with the tires of light wheels, and are covered, preferably, by plates 15, as is also shown in Fig. 6.

The hub B is made of metal and in one piece. Preferably the hub is constructed as shown in Fig. 2, in which an exterior collar 16 is formed near each end of the hub, whereby said hub is provided with an overhanging section 17 at each of its extremities, and at the central portion of the hub a series of tubular or hollow arms 18 is made integral with the body of the hub, and the inner ends of these arms are carried downward within an interior chamber 19 of the hub contained between the collars 16, and the inner extremities of the tubular arms 18 form a central support for the axle-box 20, the collars 16 forming supports for the end portions of the said hub, the box being provided with a key entering a groove in one of the collars, so as to prevent the box from turning. The tubular arms 18 are preferably made with their forward and rear walls triangular in cross-section, so as to add to their strength, and the chamber 19 is adapted to contain cotton-waste or other material saturated with oil, the oil being poured into the chamber through openings 21, made in the hub, and gains access to the axle-spindle 22 through the medium of openings 23, made in the axle-box 20.

The axle-spindle is provided with the usual nut 24 at one end and a collar 25 at the opposite end, the aforesaid collar being surrounded by a cup-like continuation 26 of the inner end of the axle-box, and the said cup extension is of such a size that a space will intervene the said extension and spindle-collar in order that a certain amount of lubricating material may be held constantly in engagement with the said collar.

The spokes 27 are securely fastened in the tubular arms 18 of the hub, as shown in Fig. 2, and the outer end of each spoke is mortised or otherwise secured in the felly or rim 11. At the outer end of each spoke a metal sleeve 28 is made to surround said spoke, and each sleeve is provided with ears 29, which extend to an engagement with the front and back of the felly or rim of the wheel, engaging also with the bottom portion of the flange of the tire, and a pin or rivet 30 is passed through the said ears and likewise through the said felly, as is also shown in Fig. 2.

A second sleeve 31 is made to surround each spoke, being attached to the outer end of the tubular hub-arm 18, in which the spoke is introduced, by means of a rivet 32 or its equivalent; and the sleeve 31 of each spoke is made to extend over the outer sleeve 28, and one pin or rivet 33 secures the two sleeves to the spoke.

When the hub B is to receive a wooden center 34, the wood is placed in the hub in a steamed state, so that it may expand, and the axle-box 35 is provided with a long exterior thread 36, in order that it may be readily driven or forced into the wood center, and is furthermore provided with a series of spiral slots 37, or slots otherwise arranged to hold a lubricating material. The axle-box in this instance is also provided with a cup extension 38 for the purpose of lubricating the axle-collar 25.

When repairing the spoke, the sleeve which is to be placed at the outer end of the spoke is preferably made as shown in Fig. 3, in which the said sleeve (designated as 39) is a longitudinally-split sleeve and is provided with apertures 40, adapted to register when the ends of the sleeve overlap, and this sleeve is provided with ears 41, corresponding to the ears 29 of the continuous sleeve 28. When the split sleeve 39 is placed upon a spoke, a short pin 42 is so driven in the inner face of the rim or felly that it will extend downward to an engagement with the inner face of one of the ears 41, and a second pin 43 is passed downward through the tire and the felly to an engagement with the inner face of the opposing arm 41, as shown in Figs. 3 and 6.

The pivot-pin 44, which secures the split sleeve on the spoke, is fully shown in the horizontal section, Fig. 4.

It will be understood that when repairs are to be made upon an old wheel the equivalent of the hub-arms 18 may be placed upon the wheel, the arms being split so as to readily encompass the spoke, and the lower end will be secured to the hub by rivets or otherwise, as desired.

Having thus described my invention, I claim as new and desire to secure by Letters Patent—

1. In a wheel, the combination, with the felly or rim and a spoke, of a sleeve encircling the spoke adjacent to the felly and provided with ears extending in engagement with opposite sides of the felly, means for securing the said sleeve to the spoke and the ears to the felly and another sleeve on the spoke secured to the first-named sleeve, as and for the purpose specified.

2. In a wheel, the combination with a felly and a spoke, of a longitudinally-split sleeve adapted to engage the spoke and having ears for attachment to the felly, and the pins extended longitudinally of the sleeve for engaging said sleeve with the felly, as and for the purpose specified.

3. In a wheel, the combination, with a hub provided with tubular arms radiating therefrom, a felly, spokes secured to the felly and entering the arms of the hub, sleeves surrounding the spokes at their connection with the felly and provided with ears extending outward at each side of the felly, being secured thereto and an intermediate sleeve surrounding each spoke, connected to the outer sleeve and the spoke and being also attached to the hub-arm in which the spoke is located, as and for the purpose specified.

JOHN S. COURT.

Witnesses:
D. P. FERGUSON,
C. J. BENTLEY.